US007235791B2

(12) United States Patent
Watanabe et al.

(10) Patent No.: US 7,235,791 B2
(45) Date of Patent: Jun. 26, 2007

(54) IMAGE INPUTTING DEVICE

(75) Inventors: Mitsuru Watanabe, Tokyo (JP); Satoshi Singu, Tokyo (JP); Koei Uno, Tokyo (JP)

(73) Assignee: NEC Corporation, Tokyo (JP)

( * ) Notice: Subject to any disclaimer, the term of this patent is extended or adjusted under 35 U.S.C. 154(b) by 71 days.

(21) Appl. No.: 11/044,571

(22) Filed: Jan. 28, 2005

(65) Prior Publication Data

US 2005/0163339 A1 Jul. 28, 2005

(30) Foreign Application Priority Data

Jan. 28, 2004 (JP) ............................ 2004-020570

(51) Int. Cl.
*G01N 21/64* (2006.01)

(52) U.S. Cl. .................................................. 250/461.1

(58) Field of Classification Search .............. 250/461.1
See application file for complete search history.

(56) References Cited

U.S. PATENT DOCUMENTS 3,943,361 A 3/1976 Miller
5,554,842 A * 9/1996 Connell et al. ............. 235/491
6,373,965 B1 * 4/2002 Liang ......................... 382/112
6,798,896 B2 9/2004 Watanabe et al.
2003/0184856 A1 * 10/2003 Otaki ......................... 359/383

FOREIGN PATENT DOCUMENTS

JP 8-30785 2/1996
JP 2001-14425 A 1/2001
JP 2001-243458 A 9/2001

* cited by examiner

*Primary Examiner*—David Porta
*Assistant Examiner*—Marcus Taningco
(74) *Attorney, Agent, or Firm*—Foley & Lardner LLP

(57) ABSTRACT

An image inputting device is provided which is capable of making reliable and speedy detection of an indicia even for an nonstandard size postal matter. The postal matter, when having passed by a proximity detecting section, is radiated with ultraviolet light at specified timing from light radiating unit. When a postal matter is radiated with ultraviolet light, fluorescence is emitted from a phosphor formed on an indicia after being pumped. In the case where the indicia is an meter, when the meter passes by a fluorescence field of view, red fluorescence enters a fluorescence light receiving optical system along a fluorescence detecting optical axis. If the indicia is a postage stamp containing a substance that emits phosphorescence, when the postage stamp passes by a phosphorescence detecting field of view where no ultraviolet light is not emitted, green fluorescence enters a phosphorescence light receiving optical system along a phosphorescence detecting optical axis.

22 Claims, 8 Drawing Sheets

IMAGE INPUTTING DEVICE

BACKGROUND OF THE INVENTION

1. Field of the Invention

The present invention relates to an image inputting device being preferably used in, for example, a culling-facing-canceling machine for postal matter, and more particularly to the image inputting device for detecting and identifying a type, position, amount, and/or a like of an indicia, such as a postage stamp, a permit imprint, a meter, and/or a like, affixed or printed on a nonstandard size mail (flat mail).

The present application claims priority of Japanese Patent Application No. 2004-020570 filed on Jan. 28, 2004, which is hereby incorporated by reference.

2. Description of the Related Art

Conventionally, in order to cancel postage stamps and/or face standard size mails (letter mails) including postcards, a culling-facing-canceling machine to be exclusively used for letters has been developed and is in actual use.

The culling-facing-canceling machine 101 for letters, as shown in FIG. 9, includes an indicia detection processing module 102 to detect and identify a kind, position, amount, and/or a like of an indicia, such as a postage stamp, a permit imprint, and a meter (postage paid) affixed or printed on postal matter, a facing processing module 103 to face postal matter (turning postal matter toward a same direction) so that the detected indicia are arranged on a lower side of the postal matter, for example, along a carrying direction, a cancellation processing module 104 to cancel (postmark) a postage stamp using, for example, an ink jet printer when the postage stamp is affixed to the postal matter, and a mail accumulating module 105 to accumulate postal matter.

The indicia detection processing module 102 has an image inputting device (not shown) (scanner) to capture an image (monochrome image or color image) affixed or printed on a postal matter being carried at a specified speed and a recognition processing section (not shown) to recognize, for example, a kind of an indicia.

When the above postal matter is radiated with ultraviolet light, a fluorescent substance formed on a surface of the postal matter is pumped and almost all stamps emit phosphorescence and almost all meter emit fluorescence.

Therefore, in the indicia detection processing module 102, by radiating the postal matter with ultraviolet light and by detecting the phosphorescence or fluorescence, processing of detecting and identifying the indicia is performed (for example, see Japanese Patent Application Laid-open No. Hei08-030785).

In the case of the standard size, since their sizes are almost equal and positions of affixing (printing) of an indicia, such as a postage stamp and a meter or the like are almost determined, the above indicia detection processing module 102 is so constructed as to detect only a position (height) of an indicia from a bottom face (face on which the postal matter is placed) of the postal matter being carried in an erected state, to arrange one set of the image inputting device, each set being made up two of the image inputting devices, in a manner in which a carrying path is interposed between the two image inputting devices configured so as to face each other and to be able to scan both front and rear sides of the postal matter.

The indicia detection processing module 102, as shown in FIG. 10, has image inputting devices 107 and 108 to be used for scanning a surface and a rear face, respectively, for detection of an indicia on both surface and rear face sides at a specified height position relative to a postal matter being transferred and being flown toward a carrying direction X on a carrying path 106, and an upside-down reversing section 109 to reverse the postal matter upside-down when necessary based on the detection result and the postal matter reversed upside-down is again transferred via a feed-back path 110 to entrance sides of the image inputting devices 107 and 108. The postal matter having passed through the indicia detection processing module 102 is transferred to the facing processing module 103 and cancellation processing module 104.

Moreover, as shown in FIG. 11, an indicia detection processing module 119 may have another configuration with no feed-back path 106 and have image inputting devices 114 and 115 used for scanning the surface and a rear face to detect the indicia on both the surface and rear face sides at a specified height position relative to a postal matter being transferred and being flown in a carrying direction Y on a carrying path 113, an upside-down reversing section 116 to reverse the postal matter upside-down when necessary based on the detection result, and the indicia detecting processing module 119 having a pair of image inputting devices 117 and 118 arranged on an exit side of an upside-down reversing section 116. The postal matter having passed through the indicia detection processing module 119 is transferred to the facing processing module 120 and cancellation processing module 121.

The indicia, though being affixed (printed) to a left upper portion of the postal matter, can be detected and identified by using the indicia detecting processing modules 102 and 119, irrespective of orientation of the postal matter (carrying pattern), that is, irrespective of a position of the indicia on the postal matter viewed from the image inputting devices 107, 108 (114, 115, 117, 118). Directional patterns of a postal matter include four patterns as shown in FIG. 12 to FIG. 15. First, as shown in FIG. 12, if a postal matter “A” is carried by a carrying belt 122 with its surface side (side to which an indicia “B” is affixed) being directed toward a side of the image inputting device 107 (114) and with the indicia “B” being placed on an upstream side, the image inputting device 107 (114) detects and identifies the indicia “B” from a carrying bottom face 122*a* (face on which the postal matter is placed) of the carrying belt 122 when at least a partial portion of the indicia “B” passes by a detection area “C” having a specified height “h”. In this case, the postal matter is not reversed upside-down by the upside-down reversing section 109 (116) and is carried toward the facing processing module 103 (120).

Moreover, as shown in FIG. 13, if the postal matter A is carried by the carrying belt 122 with its surface side being directed toward a side of the image inputting device 108 (115) and with the indicia “B” being placed on a downstream side, the image inputting device 108 (115) detects and identifies the indicia “B” when at least a partial portion of the indicia “B” passes by the detection area C. In this case, too, the postal matter B is not reversed upside-down by the upside-down reversing section 109 (116) and is carried toward the facing processing module 103 (120). Also, as shown in FIG. 14, if the postal matter A is carried by the carrying belt 122 with its surface side being directed toward a side of the image inputting device 107 (114) and with the indicia “B” being placed on the downstream side, since the indicia “B” does not pass by the detection area C, neither the image inputting device 107 (114) nor the image inputting device 108 (115) detects and identifies the indicia “B” and the indicia “B” is reversed upside-down by the upside-down reversing section 109 (116).

After that, the image inputting device 108 (118) detects the indicia "B" when at least a part of the indicia "B" passes by the detection area C, and the postal matter B is carried toward the facing processing module 103 (120).

Also, as shown in FIG. 15, if the postal matter A is carried by the carrying belt 122 with its surface side being directed toward a side of the image inputting device 108 (115) and with the indicia "B" being placed on the upstream side, since the indicia "B" does not pass by the detection region C, neither the image inputting device 107 (114) nor the image inputting device 108 (115) detects and identifies the indicia "B" and the indicia "B" is reversed upside-down by the upside-down reversing section 109 (116).

After that, the image inputting device 107 (117) detects the indicia "B" when at least a part of the indicia "B" passes by the detection area C, and the postal matter A is carried toward the facing processing module 103 (120).

In the case of the image inputting devices 107 and 108 (114, 115, 117, and 118), the phosphorescence or fluorescence emitted from the indicia "B" passing by the detection area C is feeble, a photosensor having a high sensitivity is used to receive the phosphorescence or fluorescence. Additionally, to improve a gain, a sufficiently wide aperture for receiving the light is provided and a width of a belt-shaped detection area is set at a comparatively large value. By sampling a signal output from the photosensor according to a passage state of the postal matter at specified time intervals, detection of the indicia "B" is made.

On the other hand, in the case of nonstandard size postal matter, there are many problems such as a difficulty in handling mail and device sizes, and in processing capability and, therefore, automatization (mechanization) for handling the nonstandard size postal matter is not yet advancing. That is, the nonstandard size postal matter of large and/or thin types vary largely in size, from a range of about 160 mm to about 400 mm in the carrying direction, from a range of about 150 mm to about 300 mm in height, and from a range of about 1 mm to 20 mm in thickness. An surface area of the nonstandard size postal matter is large, as a result, causing large variations in positions where indicias are affixed (printed). Also, a larger number of stamps are affixed to nonstandard size postal matter when compared with the case of standard size, in many cases.

Thus, a problem occurs when the conventional culling-facing-canceling machine for letters is used as the culling-facing-canceling machine to be applied to nonstandard size postal matter. That is, omission of the detection of postal matter increases due to variations in affixed (printed) positions since the nonstandard size postal matter is carried outside a range of the detection in a position having a specified height from the carrying bottom face (on which postal matter is placed), in many cases. Moreover, another problem occurs, for example, in that a plurality of numbers of stamps can be detected so long as the postage stamps are placed along a carrying direction, however, an omission occurs in the detection of stamps if being arranged in a longitudinal direction (vertical and scanning direction) orthogonal to a carrying direction, which, as a result, causes a decrease of merits obtained by making the detecting processes automatic. To solve this problem, a method is proposed in which a plurality of photosensors is arranged along the longitudinal direction described above.

However, this proposal has also a problem in that the photosensors can be arranged only at intervals of about 20 mm at most, due to a limitation in terms of a physical size, making it impossible to improve resolution of the photosensors and difficult to accurately detect the kind or position of the indicia. Another problem is that, to solve a problem of variations in thickness of postal matter, an adjustment of overlapping between areas for detection by the photosensors and/or compensation for variations in sensitivity among the photosensors are required. Still another problem is that, even if a single photosensor is employed, an adjustment of a gain and/or offset of the photosensor is needed and, if the plurality of the photosensors is used in combination, the adjustment is made complicated, causing much time and labor to be required. Still another problem is that use of many photosensors causes high costs. To solve this problem, technology is proposed in which a linear CCD (Charge-Coupled Device) having light sensing devices, instead of photosensors, arranged in a linear state along a vertical direction orthogonal to the carrying direction is employed for the detection of the indicia (see Japanese Patent Application Laid-open Nos. 2001-243458 and 2001-14425).

A first problem to be solved is that, when the postal matter is radiated with the ultraviolet light and, as a result, the phosphorescence or fluorescence is received from the indicia, it is difficult to receive the phosphorescence, which is emitted with delay separately from the emission of the fluorescence, in a state in which the phosphorescence is differentiated from the fluorescence, thus making it impossible to accurately detect a kind or position of the indicia of the postal matter. A second problem to be solved is that, if such a feed-back path as employed in the conventional culling-facing-canceling machine for letters or such an additional pair of the image inputting devices is provided also on a downstream side as employed in the culling-facing-canceling machine for letters, the indicia detection processing module is made larger due to the large postal matter, which causes costs to be increased and a limitation to be imposed on an installation place.

SUMMARY OF THE INVENTION

In view of the above, it is a first object of the present invention to provide an image inputting device capable of reducing costs for its manufacturing and of simply performing adjustment processing and reliable and speedy detection of an indicia even in the case of nonstandard size postal matter. It is a second object of the present invention to provide an image inputting device capable of contributing to miniaturization of an indicia detection processing module and to reduction in costs for manufacturing the image inputting device.

According to a first aspect of the present invention, there is provided an image inputting device including:

a carrying unit to carry an object along a specified carrying direction, the object having a marking pattern including phosphor;

a light radiating unit to radiate light toward the object being carried by the carrying unit to make the marking pattern emit the fluorescence or the phosphorescence;

a light radiation limiting unit to limit, when the phosphorescence is emitted from the marking pattern contained upon the object, light radiation toward the marking pattern from the light radiating unit during at least a period of time in which the phosphorescence is being emitted; and an image detecting unit to detect an image by receiving fluorescence or phosphorescence emitted from the object in a belt-shaped field of view along a direction almost orthogonal to the specified carrying direction.

In the foregoing, a preferable mode is one that wherein further includes a background emitter to emit background light by receiving the radiated light from the light radiating unit and to enable at least one dimension of the object to be detected by the background light, the background emitter is placed behind the object being carried.

Also, a preferable mode is one wherein the background emitter includes a fluorescent substance which emits the background light by receiving the radiated light from the light radiating unit.

Also, a preferable mode is one wherein the light radiation limiting unit includes a light-blocking unit to block, when the phosphorescence is emitted from the marking pattern contained upon the object, light fed from the light radiating unit to the marking pattern, during at least a period of time in which the phosphorescence is being emitted.

Also, a preferable mode is one wherein the light radiating unit includes a light source and a filter to block visible light contained in light emitted from the light source and to allow ultraviolet light to be transmitted.

Also, a preferable mode is one wherein the light source includes an ultraviolet fluorescent lamp and wherein the image detecting unit detects a monochrome image in a belt-shaped field of view in each of an radiating area being radiated with light emitted from the light source and a non-radiating area, which is placed on a downstream side along the specified carrying direction in the radiating area, being not radiated with the light emitted from the light source and wherein the light-blocking unit has a light-blocking plate to block the light emitted from the light source toward the field of view in which a monochrome image is detected in the non-radiating area.

Also, a preferable mode is one wherein the image detecting unit has a monochrome linear charge coupled device in which light sensing devices are arranged in a straight line form.

Also, a preferable mode is one wherein the light radiating unit includes at least one ultraviolet light emitting diode being able to perform flashing operations and wherein the image detecting unit detects a color image in a line-shaped field of view with timing with which a color image detecting operation is performed in synchronization with ON operations of the ultraviolet light emitting diode and with which the color image detecting operation is performed in synchronization with OFF operations of the ultraviolet light emitting diode and captures an image as a color image separately during a period of the ON operations and a period of the OFF operations.

Also, a preferable mode is one wherein the image detecting unit has a color linear charge coupled device array in which light sensing devices are arranged in a straight line form.

Furthermore, a preferable mode is one wherein the object includes a postal matter and the marking pattern is an area in which an indicia affixed or printed on the postal matter is placed.

Also, a preferable mode is one wherein the image detecting unit detects the image by receiving fluorescence or phosphorescence emitted from the object in a belt-shaped field of view along a direction almost orthogonal to the specified carrying direction.

Also, a preferable mode is one wherein the light source includes an ultraviolet fluorescent lamp and wherein the image detecting unit detects a monochrome image in a belt-shaped field of view in each of an radiating area being radiated with light emitted from the light source and a non-radiating area, which is placed on a downstream side along the specified carrying direction in the radiating area, being not radiated with the light emitted from the light source and wherein the light-blocking unit includes a light-blocking plate to block the light emitted from the light source toward the field of view in which a monochrome image is detected in the non-radiating area.

With the above configuration, fluorescence or phosphorescence can be received from an entire surface of a object and, therefore, even if the object has large variations in size, reliable and speedy detection can be made in a light emitting area. A light radiation limiting unit is provided which enables a fluorescence image and a phosphorescence image to be reliably obtained.

With another configuration as above, since the fluorescence and phosphorescence can be received from an entire object, unlike in the conventional case, repeated detection processing in a light emitting area by reversing a object is not required, thus, contributing to miniaturization of the image inputting device and reduction in costs for manufacturing the same.

With still another configuration as above, the background emitter is provided, which enables an entire size of a object to be detected.

With still another configuration as above, by using a linear CCD array as a sensor making up the detecting unit, costs can be reduced and an adjusting operation can be performed easily.

With still another configuration as above, the ultraviolet light LED is used as the light source and, by making the light source be flashed, fluorescence is received during radiating period and phosphorescence is received during non-radiating period, an fluorescence image and phosphorescence image can be detected in a same field of view and a same optical axis can be used and, therefore, the number of components can be reduced almost to a half, thus achieving miniaturization and cost reduction.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

The first aim of performing reliable and speedy detection of an indicia even in the case of a object being irregular in size (for example, nonstandard size postal matter) is achieved by providing a light radiation limiting unit and by receiving fluorescence or phosphorescence from an entire object, fluorescent and phosphorescent images can be obtained in a reliable manner. Here, by using a linear CCD (Charge-Coupled Device) array as a sensor making up an image detecting unit, costs in manufacturing the image inputting machine can be reduced and simple adjusting operations can be performed.

The second aim of contributing to miniaturization of the image inputting device and to reduction in costs for manufacturing the image inputting machine can be achieved by receiving fluorescence or phosphorescence from an entire object, unlike in the conventional case where a object is reversed upside down and repeated detecting operation in a light emitting area is required.

First Embodiment

Figure 1:
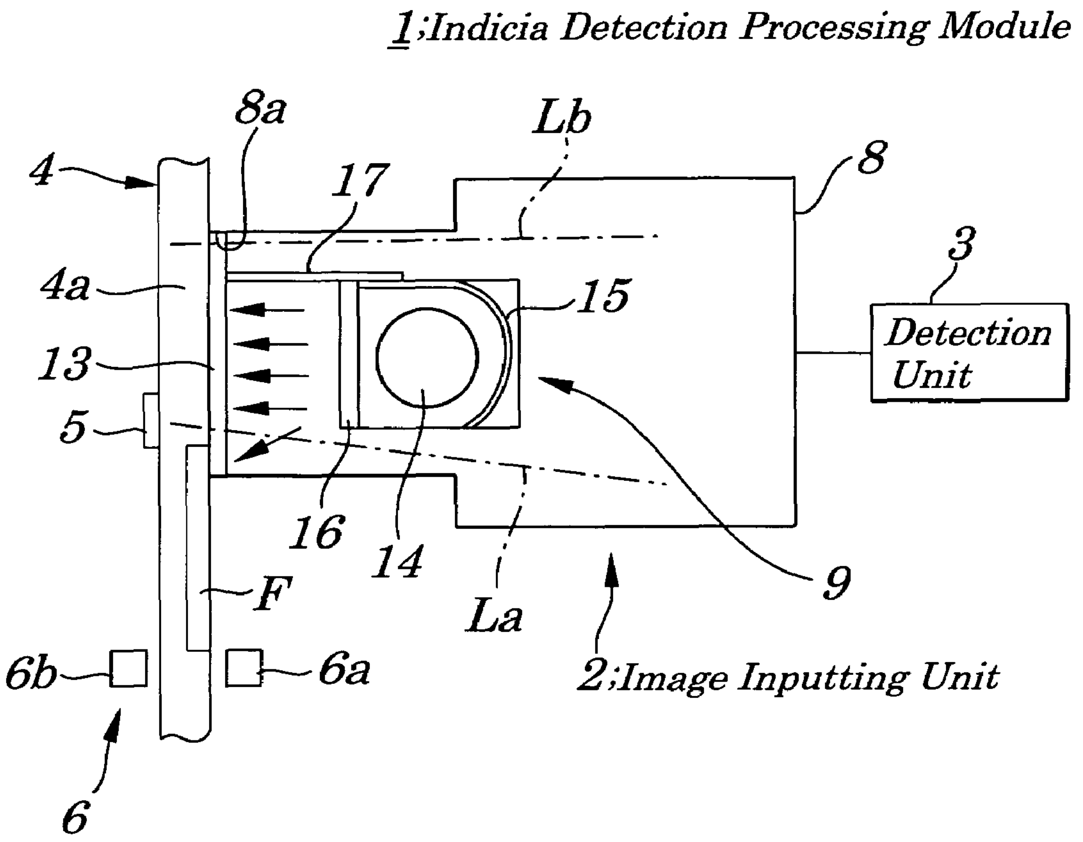
FIG. 1 is a schematic diagram illustrating configurations of an indicia detection processing module according to a first embodiment of the present invention.
Figure 2:
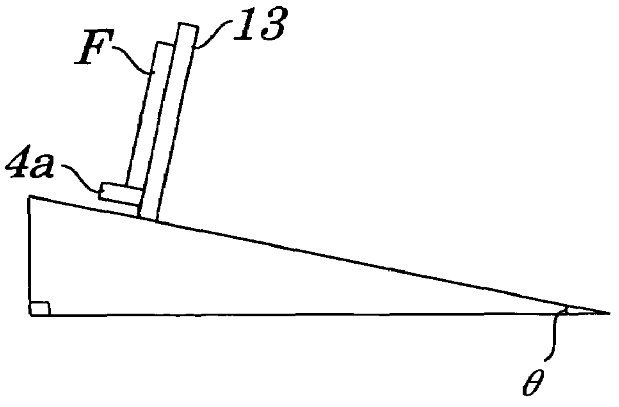
FIG. 2 is a diagram explaining configurations of the indicia detection processing module according to the first embodiment of the present invention.
Figure 3:
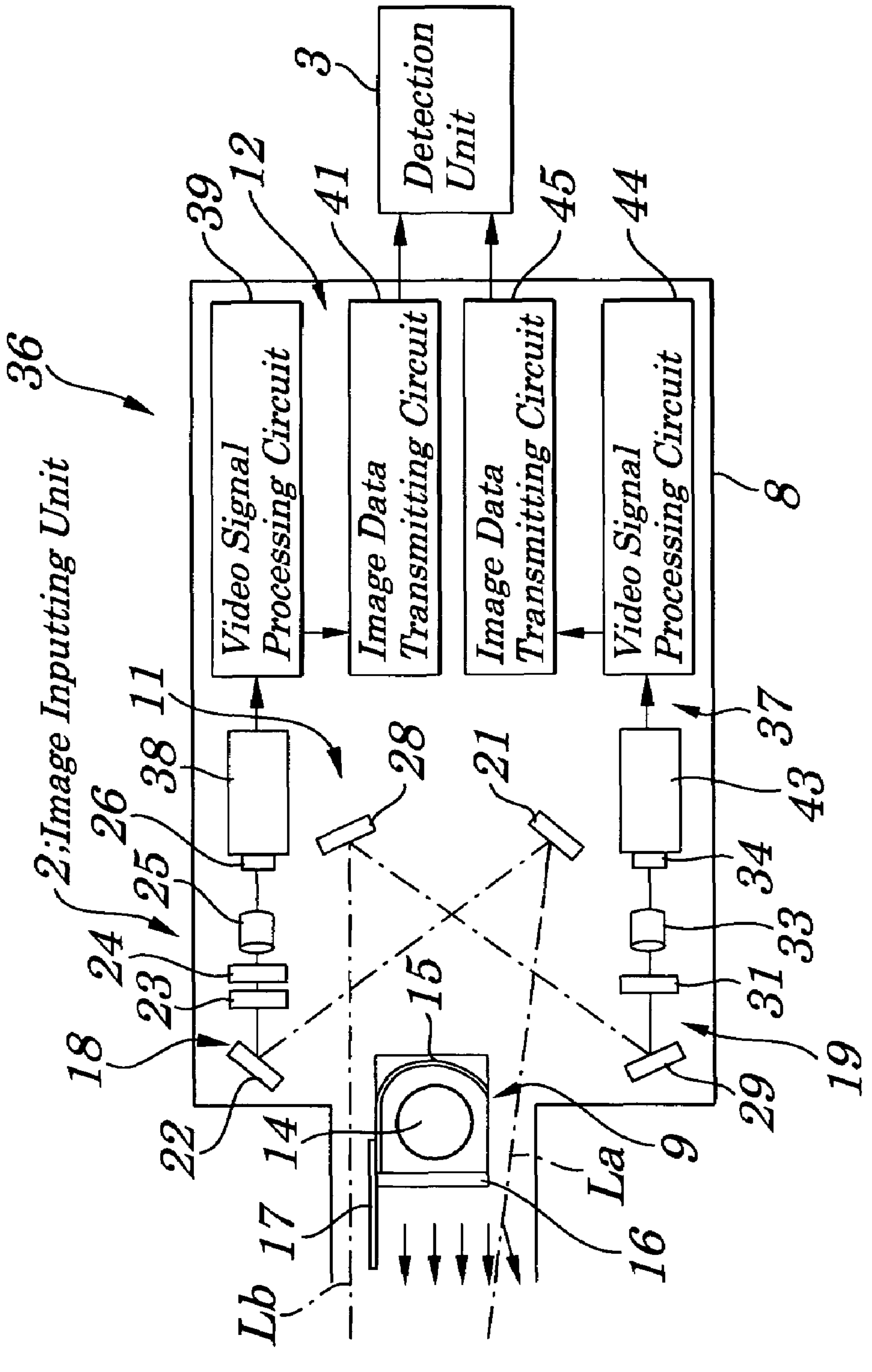
FIG. 3 is a schematic diagram further illustrating configurations of the indicia detection processing module.
Figure 4:
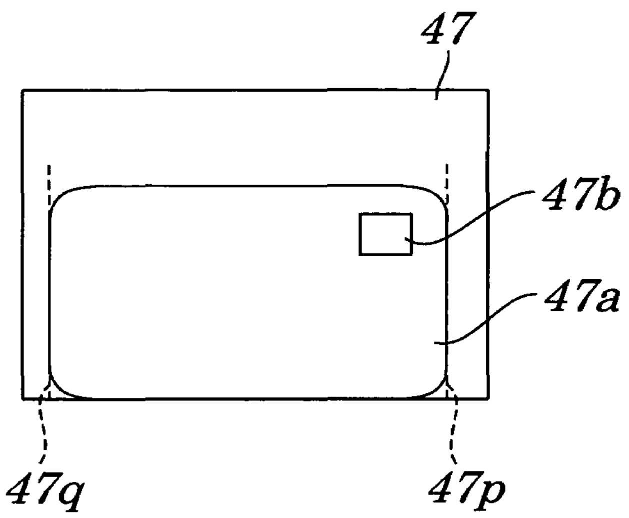
FIG. 4 is a diagram showing an example of an image to be captured by the indicia detection processing module.

FIG. 1 is a diagram schematically illustrating configurations of an indicia detection processing module 1 of a first embodiment of the present invention. FIG. 2 is a diagram explaining configurations of the indicia detection processing module 1 of the first embodiment. FIG. 3 is a diagram schematically illustrating configurations of the indicia detection processing module of the first embodiment. FIG. 4 is a diagram showing an example of an image to be captured by detecting units making up the indicia detection processing module 1 of the first embodiment.

The indicia detection processing module 1 of the embodiment includes an image inputting unit 2 making up a culling-facing-canceling machine for nonstandard size postal matter (flat mail) to make an nonstandard size postal matter "F" be radiated with ultraviolet light and to receive fluorescence and phosphorescence from an indicia, such as a postage stamp, a permit imprint, a meter (postage paid) or a like affixed to and printed on the postal matter F, a detection unit 3 to detect a kind, position, amount, or a like of the indicia, a carrying section 4 to carry the postal matter F to a specified carrying direction (not shown), a background displaying section 5 made up of a fluorescent substance to detect a size of the postal matter F, and a proximity detecting section 6 to detect an approach of the postal matter "F". Moreover, the indicia detection processing module 1, as shown in FIG. 2, is mounted so as to be inclined at a specified angle θ (for example, 10°) relative to a plane face. In the embodiment, at least a pair of the image inputting units 2 (only one is shown) and background displaying units 5 (only one is shown) is arranged in a manner to be symmetric with respect to a carrying belt of the carrying section 4 in order to perform scanning on a surface and a rear face of the postal matter F.

The image inputting unit 2, as shown in FIG. 3, includes a housing 8, a light radiating section 9 to generate ultraviolet light and to make the postal matter F be radiated with the ultraviolet light, a light receiving section 11 to receive fluorescence and phosphorescence from the indicia, and an image signal processing section 12. On a side of the carrying section 4 in the housing 8 is formed an aperture 8*a* to be used for emitting ultraviolet light supplied from the light radiating section 9 toward the postal matter F and for allowing fluorescence and/or phosphorescence emitted from the indicia to be entered, and a transparent window member 13 made of synthetic silica glass is fitted in the aperture 8*a*. Since the window member 13 is fitted in the aperture 8*a*, invasion of dust into the inside of the housing 8 is prevented. The synthetic silica glass being a material making up the window member 13 has sufficient optical transmittance that allows visible light to ultraviolet light to be transmitted through the material and is made up of compositions that emit no fluorescence when being radiated with ultraviolet light. This prevents occurrence of an offset noise in detected images caused by fluorescence emitted from the window member 13 itself and avoids degradation in detecting capability.

The light radiating section 9, as shown in FIG. 3, includes an ultraviolet fluorescent lamp 14 that emits ultraviolet light, a reflecting plate 15 being mounted on a rear side of the ultraviolet fluorescent lamp 14 to make ultraviolet light emitted from the ultraviolet fluorescent lamp 14 be reflected on a side of the carrying section 4, a filter 16 to allow ultraviolet light to be transmitted and to block visible light, and a light-blocking plate 17 arranged on a downstream side of the ultraviolet fluorescent lamp 14 to prevent radiation with ultraviolet light in an indicia arranging area (not shown or labeled) during a period of emission of the phosphorescence. The ultraviolet fluorescent lamp 14 is a straight-pipe shaped fluorescent lamp and is mounted in an erected state in a manner in which a position in a height direction in the light emitting area (not shown or labeled) in an intermediate portion (not shown or labeled) coincides with that in a height direction in a belt-shaped field of view (not shown or labeled) for detection of fluorescence and phosphorescence. In the embodiment, the ultraviolet fluorescent lamp 14 having an entire length of about 400 mm and a length of its intermediate portion excluding higher and lower ends each being about 50 mm in length is about 300 mm. From this intermediate portion, ultraviolet light are emitted with uniform intensity along the height direction.

The reflecting plate 15 is made of stainless steel being excellent in weather resistance and having a high light resistance against ultraviolet light in particular and its surface on the side of the ultraviolet fluorescent lamp 14 is polished. Moreover, the reflecting plate 15 is so configured that a length along a direction orbiting around the ultraviolet fluorescent lamp 14 is set to be long in an area on a downstream side along the carrying direction and to be short in the area on an upstream side and is constructed so as to maintain high radiation efficiency and so that not only the ultraviolet light directly emitted from the ultraviolet fluorescent lamp 14, but also light reflected from the reflecting plate 15 is not emitted in an area overlapping with a field of view for detection of phosphorescence.

The filter 16 is mounted on the side of the carrying section 4 in the ultraviolet fluorescent lamp 14. The ultraviolet fluorescent lamp 14 is considered to emit only ultraviolet light according to its principles. However, the ultraviolet light emit a slight amount of visible light due to impurities in the lamp tube and to adverse effects caused by a lamp tube surface, or a like. If the postal matter F is radiated with such visible light as above, an offset noise occurs in a detected image, causing degradation in detection capability and, to prevent the emission of visible light, the filter 16 is provided. The light-blocking plate 17 is mounted along the carrying direction in a manner to be adjacent to a downstream side of the ultraviolet fluorescent lamp 14 so that ultraviolet light are not emitted in an area overlapping with a field of view for detection of phosphorescence.

The light receiving section 11, as shown in FIG. 3, has a fluorescent light receiving optical system 18 to receive fluorescence emitted from an indicia along a fluorescence detecting optical axis La and a phosphorescence receiving optical system 19 to receive phosphorescence emitted from the indicia along a phosphorescence detecting optical axis Lb. The fluorescent light receiving optical system 18 includes mirrors 21 and 22 to make fluorescence incident along the fluorescence detecting optical axis La be reflected, a near-infrared light cutting filter 23, a red color filter 24, a condenser lens 25, and a monochrome linear CCD (Charge-Coupled Device) array 26 to receive an image formed by light gathered by the condenser lens 25.

The fluorescence detecting optical axis La is set so as to be able to detect a position in which ultraviolet light are emitted. Here, the fluorescence detecting optical axis La is set so as to intersect a line of the carrying direction slightly slant so that a fluorescence detecting field of view is directed to a position being radiated most intensely with ultraviolet light. The mirrors 21 and 22 are used with an aim of increasing a length of an optical path to suppress variations in magnification for the fluorescence detecting optical axis La and of making the image inputting device 2 compact. The near-infrared cutting filter 23 allows light having a wavelength of 650 nm or less to be transmitted through and the red color filter 24 allows light having a wavelength of 600 nm or more to be transmitted through. The near-infrared cutting filter 23 and red color filter 24 are used to be operated in the case where a meter as an indicia (not shown) emits red fluorescence (for example, in the case of the meter, that emits red fluorescence, being employed in Japan and in the United States). Thus, the meter emitting red fluorescence is detected by the filters 23 and 24.

The phosphorescence receiving optical system 19 has mirrors 28 and 29 to make phosphorescence being incident along the phosphorescence detecting optical axis Lb be reflected, a green color filter 31, a condenser lens 33, a monochrome linear CCD array 34 to receive an image formed by light gathered by the condenser lens 33. The phosphorescence detecting optical axis Lb is pumped by radiation with ultraviolet light and is set so that, in order to detect the phosphorescence emitted with delay, an indicia falls within a phosphorescence detecting field of view during a phosphorescence emitting period after radiation with ultraviolet light. At this time point, since intensity of emission of the phosphorescence is lowered after the radiation with ultraviolet light as time elapses, the phosphorescence detecting optical axis Lb is set so as to come as near as possible to the light-blocking plate 17; however, it is adjusted to a best position by taking diffraction of ultraviolet light at an edge portion of the light-blocking plate 17 and variations in thickness of the postal matter F into consideration.

The green color filter 31 allows only light having a wavelength between 500 nm and 580 nm to be transmitted through. Thus, the green color filter 31 is used to be operated in the case where a meter emits a green color light only (for example, in the case of the meter, that emits a green color only, being employed in the United States). Thus, the meter emitting green color light is detected by the filters 23 and 24. The configuration of the phosphorescent receiving optical system 19 of the embodiment is used to be operated in the case where a color of phosphorescence emitted from the indicia is monochrome (only green color in the embodiment).

The image signal processing section 12 has a fluorescence image processing section 36 to obtain the fluorescence image and a phosphorescence image processing section 37 to obtain the phosphorescence image. The fluorescence image processing section 36 has a CCD (Charge-Coupled Device) circuit 38 to make a photoelectric conversion, a video signal processing circuit 39 to amplify an electric signal output from the CCD circuit 38 and to normalize its signal level for A/D (Analog/Digital) conversion, and an image data transmitting circuit 41 to make a parallel/serial conversion to a video signal output from the video signal processing circuit 39 and to transmit the converted video signal to the detection unit 3. The electric signal output from the CCD circuit 38 is amplified by the video signal processing circuit 39, for example, 30-fold. The image data transmitting circuit 41 adjusts timing with which an image is captured and makes a frequency conversion required to transfer fluorescence image data to the detection unit 3 and to transfer fluorescence image data, together with a control signal, to the detection unit 3, using an LDVS (Low Voltage Differential Signaling) signal.

The phosphorescence image processing section 37 includes a CCD circuit 43 to make a photoelectric conversion, a video signal processing circuit 44 to amplify electric signals output from the CCD circuit 43, to normalize a signal level and to makes a digital conversion and an image data transmitting circuit 45 to make a parallel/serial conversion to a video signal output from the video signal processing circuit 44 and to transmit the converted signal to the detection unit 3. The electric signal output from the CCD circuit 43 is amplified by a video signal processing circuit 44, for example, 30-fold. The image data transmitting circuit 45 adjusts timing with which an image is captured and makes a frequency conversion required to transfer fluorescence image data to the detection unit 3 and to transfer fluorescence image data, together with a control signal, to the detection unit 3, using an LDVS signal.

The carrying section 4 includes a carrying belt **4*a* to load the postal matter F in the erected state and to transfer the postal matter F at a specified speed (for example, 1.5 m/sec) and a side belt (not shown) to support a side face of the postal matter F. In the embodiment, a width of the carrying belt 4*a* is set so that the postal matter F having a thickness of a maximum about 20 mm can be carried. As shown in FIG. 2, the carrying belt 4*a*, image inputting unit 2, and detection unit 3 are arranged in a manner to be inclined by an angle θ with respect to a plane face so that a position of a side end portion on a side of the image inputting unit 2 on a face on which the carrying belt 4a is placed (carrying bottom face) is lower than that of a side end portion being opposite to the side of the image inputting unit 2. As a result, the postal matter F, while being carried by the carrying belt 4a, moves in a manner to slide on a surface of the window member 13 when the postal matter F passes by the image inputting unit 2. This causes dust being adhered to a surface of the window member 13** to be removed and a clean state to be maintained, which prevents decreases in output the amount of the ultraviolet light and in the amount of received fluorescence and phosphorescence.

The background displaying section 5 is placed along the fluorescence detecting optical axis La on an opposite side of the image inputting unit 2 with the carrying belt 4a being interposed between the background displaying section 5 and the image inputting unit 2. The background displaying section 5 is made of phosphor being excellent in weather resistance and having a high light resistance against ultraviolet light in particular.

The proximity detecting section 6 has a photoelectric sensor made up of a light emitting section 6a and a light receiving section 6b both being arranged in a manner to face each other and with the carrying belt 4a being interposed between the light emitting section 6a and the light receiving section 6b and is arranged on an upstream side along a carrying direction of the image inputting unit 2 to be used to perform timing with which a fluorescent image and a phosphorescent image are detected.

Next, operations of the indicia detection processing module 1 having the above configurations are described by referring to FIG. 1 to FIG. 4. The postal matter F, when having been introduced into the indicia detection processing module 1, is placed on the carrying belt 4a in a state in which the postal matter F is erected on the carrying belt and is supported by the side belt and is inclined at a specified angle θ, and is carried toward the image inputting unit 2 at a specified speed (for example, 1.5 m/sec) by the carrying belt 4a and the side face belt. When the postal matter F, after having passed by the proximity detecting section 6, is radiated with ultraviolet light with specified timing by the light radiating section 9 in the image inputting unit 2.

Here, the carrying belt 4a, image inputting unit 2, and detection unit 3 are arranged in a manner to be inclined by an angle θ with respect to a plane face so that a position of a side end portion on a side of the image inputting unit 2 on a face on which the carrying belt 4a is placed (carrying bottom face) is lower than that of a side end portion being opposite to the side of the image inputting unit 2 and, therefore, the postal matter F, while being carried by the carrying belt 4a, moves in a manner to be slid on a surface of the window member 13 when the postal matter F passes by the image inputting unit 2. This causes dust being adhered to a surface of the window member 13 to be removed and a clean state to be maintained, which prevents a decrease in the output amount of ultraviolet light and in the amount of received fluorescence and phosphorescence.

When the postal matter "F" is radiated with the ultraviolet light uniformly, fluorescence is emitted from phosphor after having been pumped and, for example, in the case of meter, when the indicia on the postal matter F passes by a fluorescence detecting field of view, red fluorescence enters the fluorescent light receiving optical system 18 along the fluorescence detecting optical axis La. The red fluorescence is reflected off the mirrors 21 and 22 and, after its travelling direction is changed, transmits through the near-infrared cutting filter 23 and red color filter 24. Then, the red fluorescence is gathered by the condenser lens 25 and the gathered fluorescence forms an image on the monochrome linear CCD array 26 and the image is converted photoelectrically by the CCD circuit 38 and is amplified by the video signal processing circuit 39 and is input to the detection unit 3 through the image data transmitting circuit 41. Moreover, the image data transmitting circuit 41 controls the timing with which the image is captured by receiving a detecting signal transmitted from the proximity detecting section 6.

Furthermore, if the indicia is, for example, a postage stamp (for example, one being employed in the United States) and contains a substance that emits, for example, phosphorescence, when the postal matter F passes by the phosphorescence detecting field of view in which ultraviolet light are not radiated, green phosphorescence enters the phosphorescence receiving optical system 19 along the phosphorescence detecting optical axis Lb. The green phosphorescence is reflected off the mirrors 28 and 29 and, after its travelling direction is changed, is transmitted through the green color filter 31. Then, the green fluorescence is gathered by the condenser lens 33 and an image is formed by the gathered phosphorescence on the monochrome linear CCD array 34 and the image is converted photo-electrically by the CCD circuit 43 and is amplified by the video signal processing circuit 44 and is input to the detection unit 3 through the image data transmitting circuit 45. Moreover, the image data transmitting circuits 41 and 45 control the timing with which the image is captured by receiving the detecting signal transmitted from the proximity detecting section 6.

In the embodiment, a resolution in a direction (longitudinal direction being orthogonal to the carrying direction) of scanning for picking up a fluorescent image or phosphorescent image is set to be 1.6 pieces/mm which is selected as a value that can sufficiently detect a position for stamping and canceling a postage stamp, and facing postal matter. Also, a dimension of field of view is about 300 mm in a scanning direction and, therefore, the number of pixels being used is 480. Moreover, monochrome linear CCD array 26 and 34 are employed which have the number of pixels being more than the number of pixels being used. The light is intercepted from pixels being not used to avoid degradation of image quality, which enables reduction of costs. A fluorescent image 47 captured in the detection unit 3 contains, for example, an image of a postal matter 47a and the postal matter image 47a contains an indicia image 47b as shown in FIG. 4. Here, only the indicia image 47b out of the postal matter image 47a is provided as a bright image and an area excepting the indicia image 47b is shown as a dark image. The area excepting the postal matter image 47a out of the fluorescent image 47 is provided as a bright image by fluorescence emitted from the background displaying section 5.

In the detection unit 3, processing of recognizing a kind of a postage stamp and/or a meter or a like is performed by using the captured fluorescent image 47. Also, the detection unit 3 creates a histogram, for example, in every scanning direction and specifies a size in a height direction of the postal matter F. Moreover, as shown in FIG. 4, the detection unit 3 sets somewhat early timing with which capturing of a fluorescent image is started and sets somewhat late timing with which capturing of the fluorescent image is terminated and creates a top edge 47p and an end edge 47q to specify a size (length) in the carrying direction.

After that, the postal matter "F", to make a detected indicia be placed on a lower side, for example, along the carrying direction, is transferred to a facing processing module (not shown) to facing the postal matter "F" (turning postal matter "F" toward a same direction), a cancellation processing module (not shown) to cancel a postage stamp by using, for example, an ink jet printer when a postage stamp is affixed, and a mail accumulating module (not shown) to accumulate the postal matter "F".

Thus, according to configurations of the embodiment, a bright image appears only in a place where an indicia is affixed (printed), out of image of the postal matter, and, therefore, easy and simple detection of the indicia is made possible. Moreover, since the fluorescence and phosphorescence are received from an entire postal matter, even in the case of nonstandard size postal matter having variations in size, the indicia can be detected reliably and speedily. Also, even when a plurality of indicias is affixed (printed), reliable detection is made possible. Furthermore, the light-blocking plate 17 is placed on a side of the downstream in the ultraviolet fluorescent lamp 14 and radiation of the area in which an indicia is placed with ultraviolet light, during a period of time in which the phosphorescence is being emitted, is avoided and fluorescence being incident along the fluorescence detecting optical axis La is received and phosphorescence being incident along the phosphorescence detecting optical axis Lb is received and, as a result, fluorescent and phosphorescent images can be reliably obtained.

Furthermore, by using, for example, a linear CCD array as a sensor, costs can be reduced and adjustment operations can be performed simply. Conventionally, the background displaying section 5 is not mounted and, therefore, only the indicia is shown as a bright image. However, according to the present invention, a background of a postal matter being an optical background is shown as a bright image by fluorescence emitted from the background displaying section 5, a size of a postal matter (size in the height direction and in the carrying direction) can be identified. The use of an upside-down reversing section, a feed-back path, an image inputting device (detection), or a like, which are employed in the conventional technology, is not required, thus contributing to miniaturization of the indicia detection processing module and reduction in costs. By placing the near-infrared light cutting filter 23 to correspond to fluorescent color and phosphorescent color, the red color filter 24, and the green color filter 31 to remove a noise component of a color other than light emitting color of the indicia, detecting capability can be improved.

Moreover, by monitoring light emitting intensity of the phosphor making up the background displaying section 5, abnormality in the ultraviolet fluorescent lamp 14 serving as a light source can be detected. By using the phosphor being excellent in weather resistance and having high light resistance against ultraviolet light in particular, maintenance is not required. Moreover, by increasing an optical path for the fluorescence detecting optical axis La using, for example, the mirrors 21 and 22, variations in magnification caused by changes in thickness of the postal matter can be suppressed and the image inputting device can be made compact. By setting a comparatively high gain in the video signal processing circuits 39 and 44, feeble fluorescence and phosphorescence can be detected.

Second Embodiment

Figure 5:
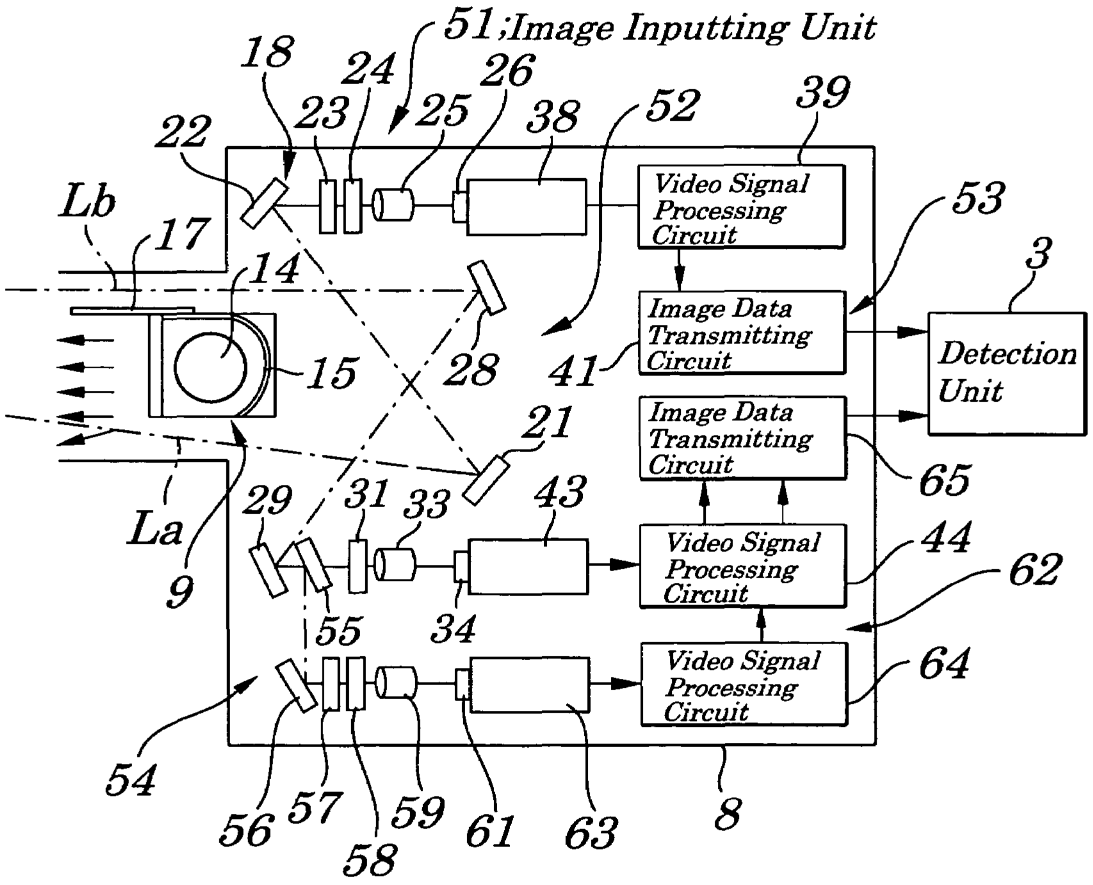
FIG. 5 is a schematic diagram illustrating configurations of an indicia detection processing module according to a second embodiment of the present invention.

FIG. 5 is a diagram schematically illustrating configurations of an indicia detection processing module according to a second embodiment of the present invention. The configurations of the indicia detection processing module of the second embodiment differs from those of the first embodiment in that a phosphorescence receiving optical system is not so configured that it can receive two phosphorescence emitting colors (for example, green and red colors) emitted from an indicia unlike in the conventional case where the indicia detection processing module can receive one single phosphorescence emitting color (for example, green color only). Configurations other than those described above are the same as those in the first embodiment and their descriptions are omitted accordingly.

An image inputting unit 51 employed in the indicia detection processing module of the second embodiment includes a housing 8, a light radiating section 9, a light receiving section 52 to receive fluorescence and phosphorescence, and an image signal processing section 53. The light receiving section 52 has a fluorescence receiving optical system 18 to receive fluorescence emitted along a fluorescence detecting optical axis La and a phosphorescence receiving optical system 54 to receive phosphorescence emitted along a phosphorescence detecting optical axis Lb. The phosphorescence receiving optical system 54 includes mirrors 28 and 29 to reflect phosphorescence having been incident along the phosphorescence detecting optical axis Lb, a dichroic mirror 55, a green color filter 31, a condenser lens 33, a monochrome linear CCD array 34 to receive an image formed by light gathered by the condenser lens 33, a near-infrared cut filter 57, a red color filter 58, a condenser lens 59, and a monochrome linear CCD array 61 to receive an image formed by light gathered by the condenser lens 59.

The dichroic mirror 55 is mounted so as to be inclined at an angle 45° relative to the phosphorescence detecting axis Lb. The green filter 31 receives light having transmitted through the dichroic mirror 55 and allows light having wavelengths between 500 nm and 580 nm to be transmitted through. Also, a mirror 56 receives light reflected from the dichroic mirror 55 and makes the light be reflected to the near-infrared cut filter 57. The near-infrared cut filter 57 allows light having a wavelength of 650 nm or less to be transmitted and the red color filter 58 allows only light having a wavelength of 600 nm or more to be transmitted.

As a result, the image inputting device 51 is used when an ordinary stamp serving as an indicia emits green color phosphorescence and an express stamp emits red color phosphorescence (for example, in the case of postage stamps employed in Japan) and if the phosphorescence emitted from the indicia is incident along the phosphorescence detecting optical axis Lb, the light is branched by the dichroic mirror 55 in two directions and each branched light transmits the filter and passes through the circuit as in the case of the first embodiment and is transferred through an image data transmitting circuit 65 to a detection unit 3, thus detection of these stamps is achieved. The phosphorescence receiving optical system 54 of the embodiment is so configured as to operate when the number of colors of phosphorescence emitted from the indicia is two (in the embodiment, a green color and a red color).

The image signal processing section 53 has a fluorescent image processing section 36 and a phosphorescent image processing section 62 to obtain a phosphorescent image. The phosphorescence image processing section 62 has CCD circuits 43 and 63 to make a photoelectric conversion, video signal processing circuits 44 and 64 to amplify an electric signal output from the CCD circuits 43 and 63 to normalize its signal level and to make a digital conversion, the image data transmitting circuit 65 to make a parallel/serial conversion of a video signal output from the video signal processing circuits 44 and 64 and to transmit the video signal to the detection unit 3. The video signal processing circuit 44 is used to perform processing of a green phosphorescent image and the video signal processing unit 64 is used to perform processing of a red phosphorescent image and each of the images is amplified 30-fold. The image data transmitting circuit 65 adjusts timing with which the green color phosphorescent image and the red color phosphorescent image are captured and makes a frequency conversion to transfer fluorescence image data to the detection unit 3 and transfers fluorescence image data, together with a control signal, to the detection unit 3 using an LDVS signal (not shown).

Thus, according to the second embodiment, approximately the same effects as obtained in the first embodiment can be achieved.

Third Embodiment

Figure 6:
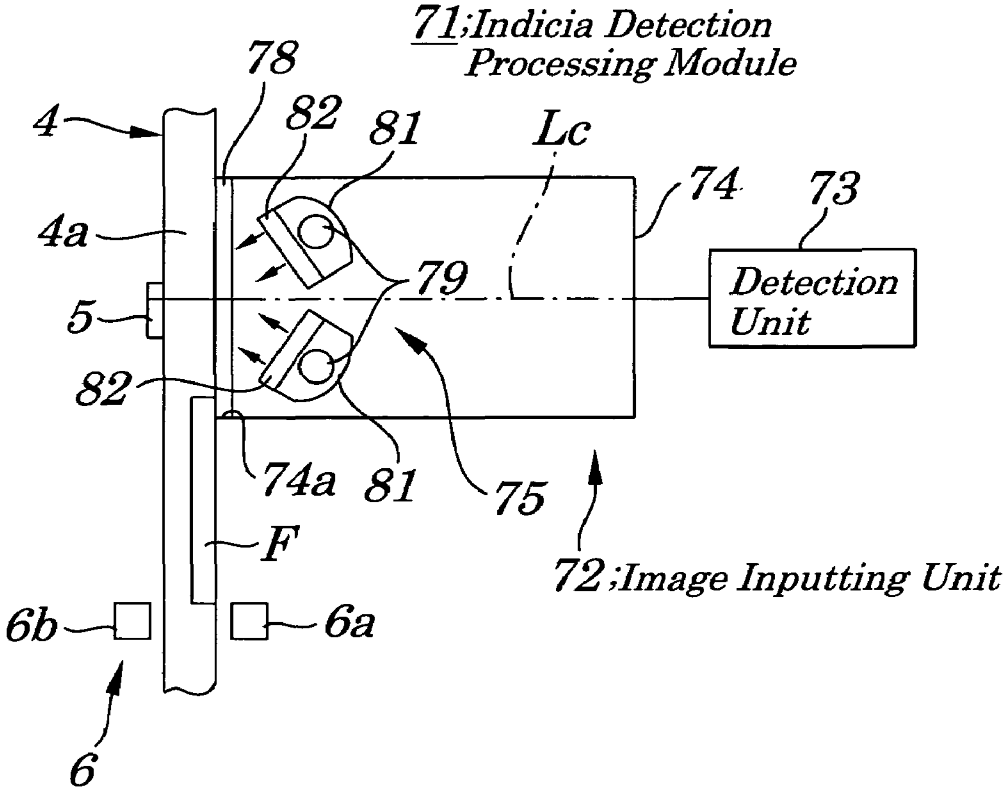
FIG. 6 is a schematic diagram illustrating configurations of an indicia detection processing module according to a third embodiment of the present invention.
Figure 7:
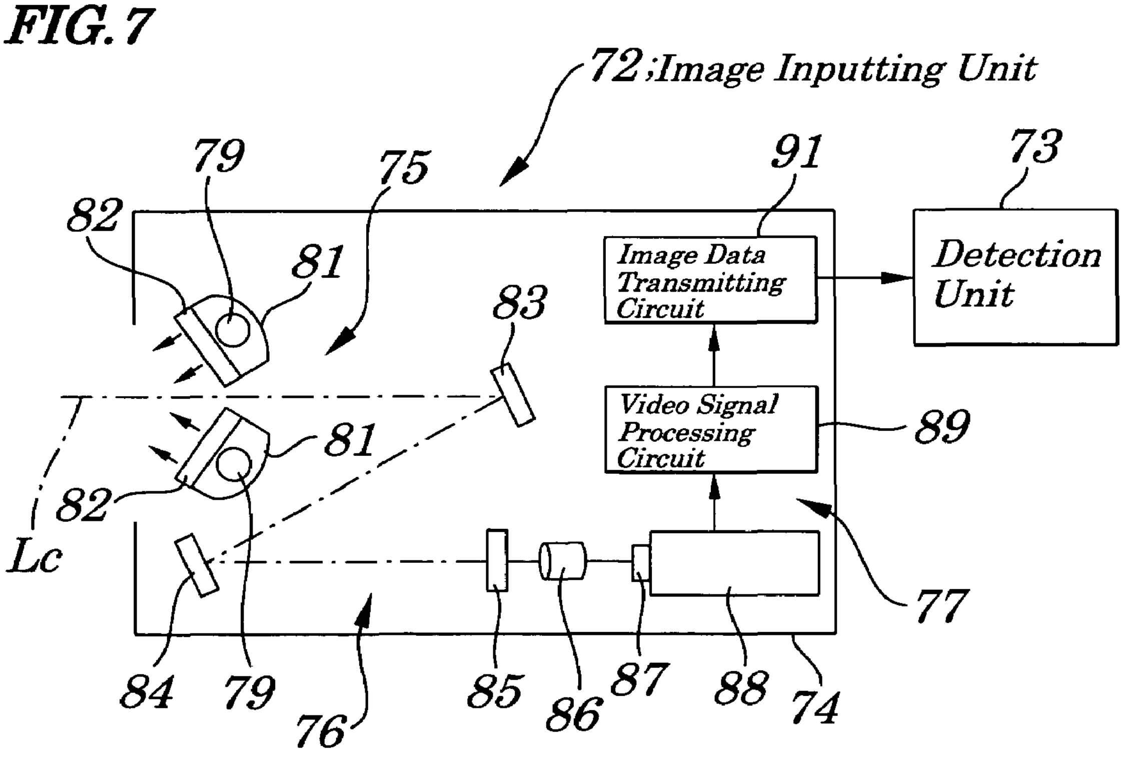
FIG. 7 is a diagram schematically showing configurations of an indicia detection processing module of the third embodiment of the present invention.
Figure 8:
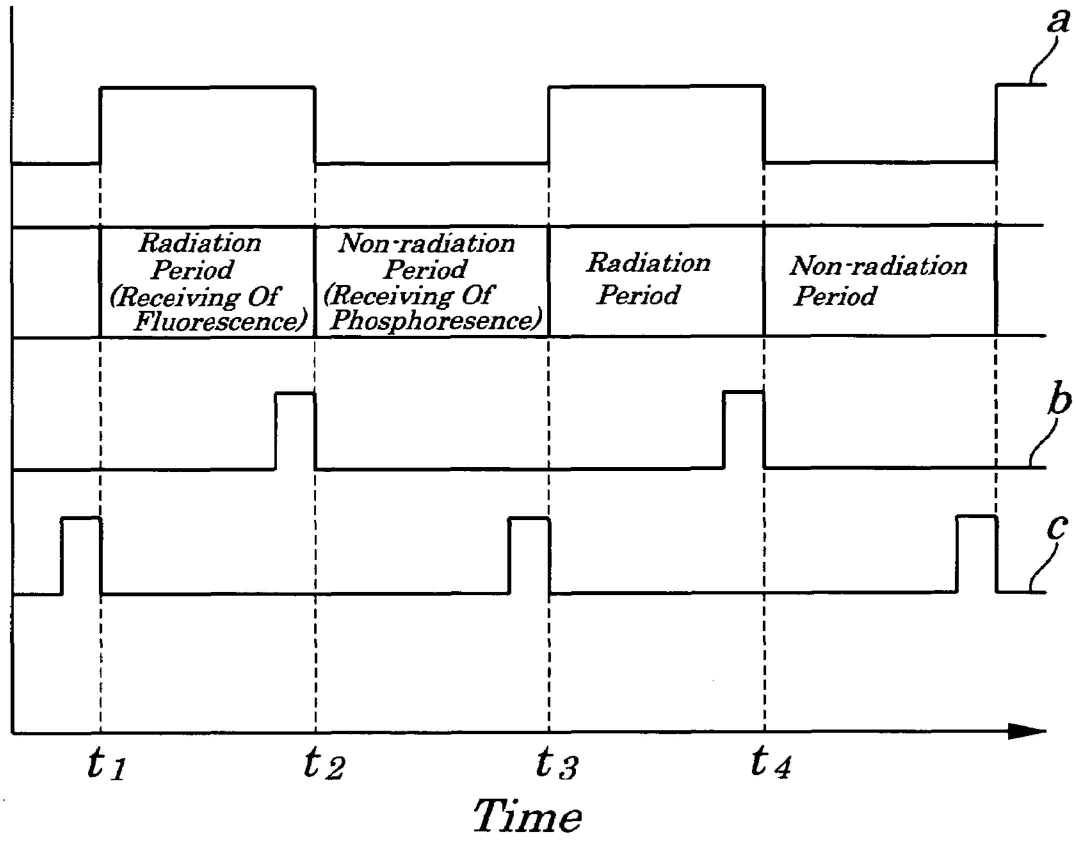
FIG. 8 is a time chart explaining operations of the indicia detection processing module of the third embodiment of the present invention.
Figure 9:
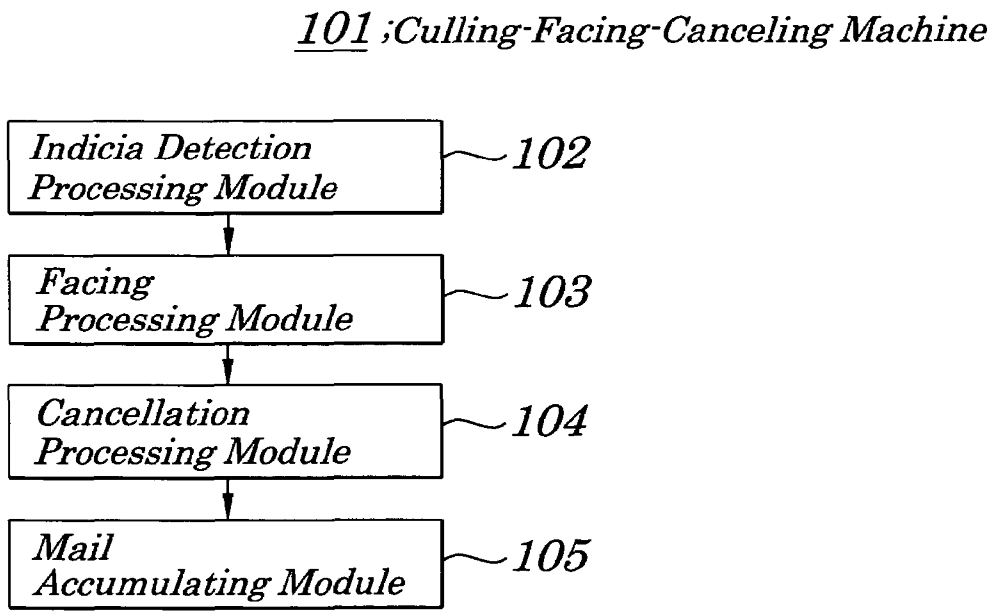
FIG.9 (PRIOR ART)
FIG. 9 is a diagram showing configurations of a culling-facing-canceling machine for letters to explain conventional technology.
Figure 10:
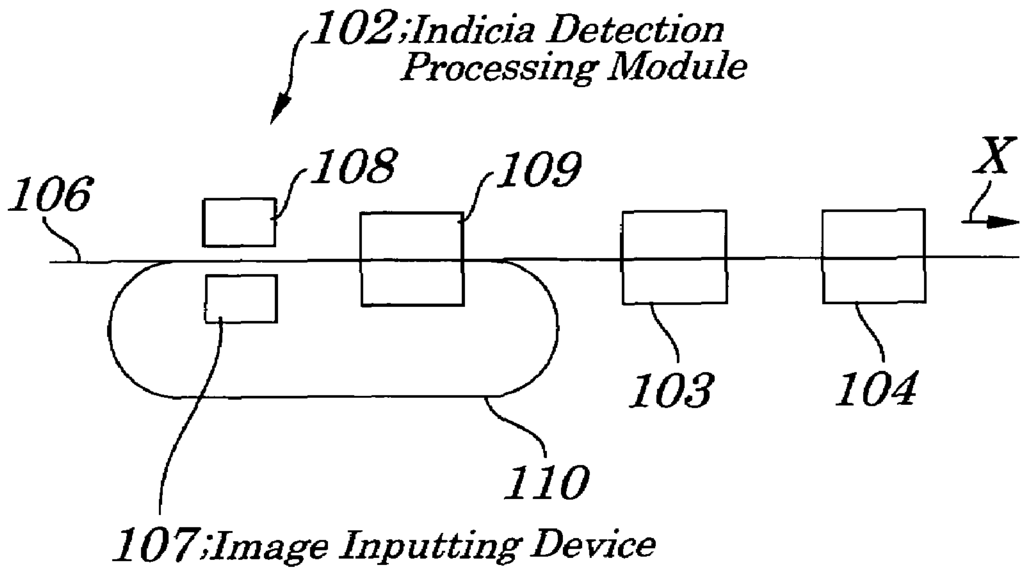
FIG. 10 (PRIOR ART)
FIG. 10 is a block diagram showing configurations of an indent detection processing module of a culling-facing-canceling machine for letters to explain a conventional technology.
Figure 11:
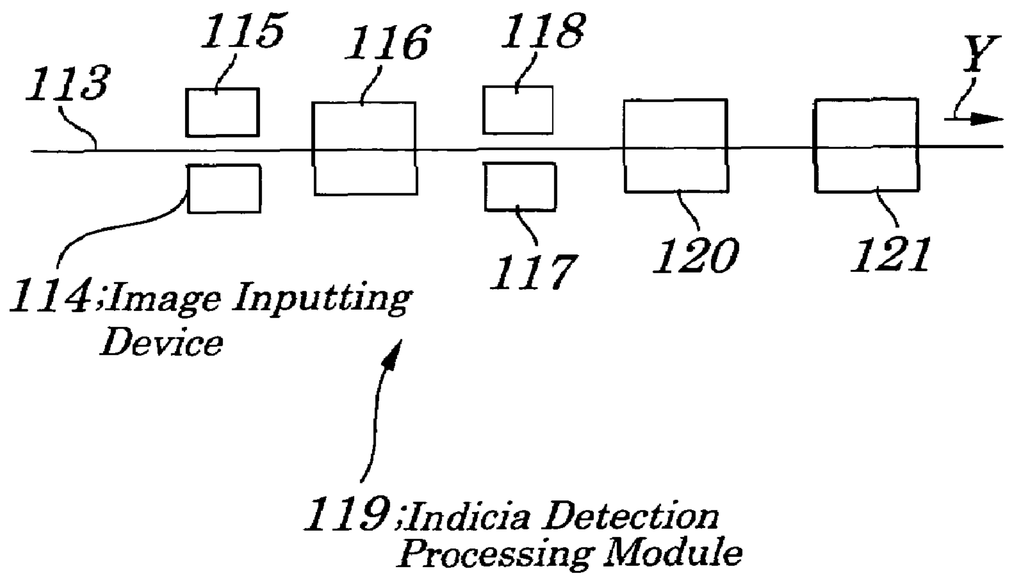
FIG. 11 (PRIOR ART)
FIG. 11 is a block diagram showing configurations of an indent detection processing module of another culling-facing-canceling machine for letters to explain the conventional technology.
Figure 12:
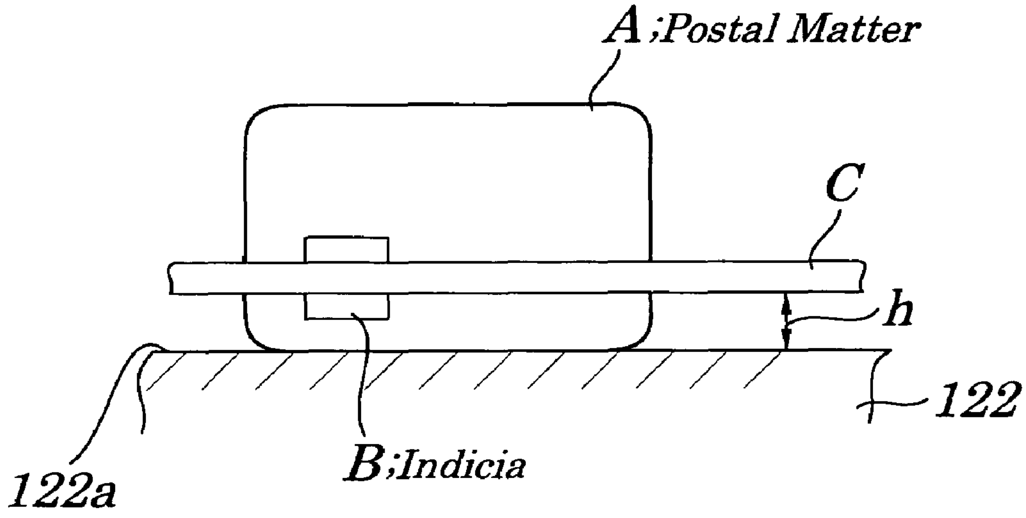
FIG.12 (PRIOR ART)
FIG. 12 is a diagram showing operations of an image inputting device of an indicia detecting processing module to explain the conventional technology.
Figure 13:
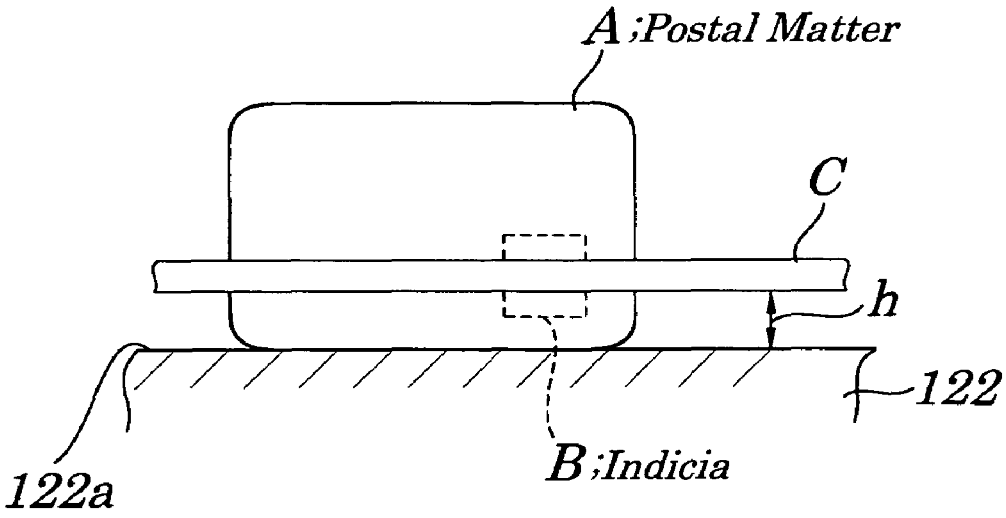
FIG.13 (PRIOR ART)
FIG. 13 is another diagram showing operations of the image inputting device of the indicia detecting processing module to explain the conventional technology.
Figure 14:
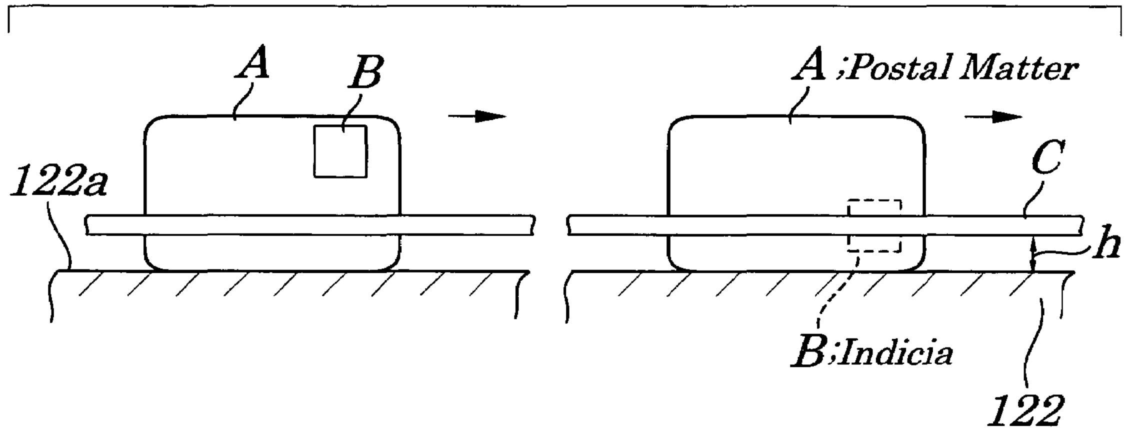
FIG. 14 (PRIOR ART)
FIG. 14 is yet another diagram showing operations of the image inputting device of the indicia detecting processing module to explain the conventional technology.
Figure 15:
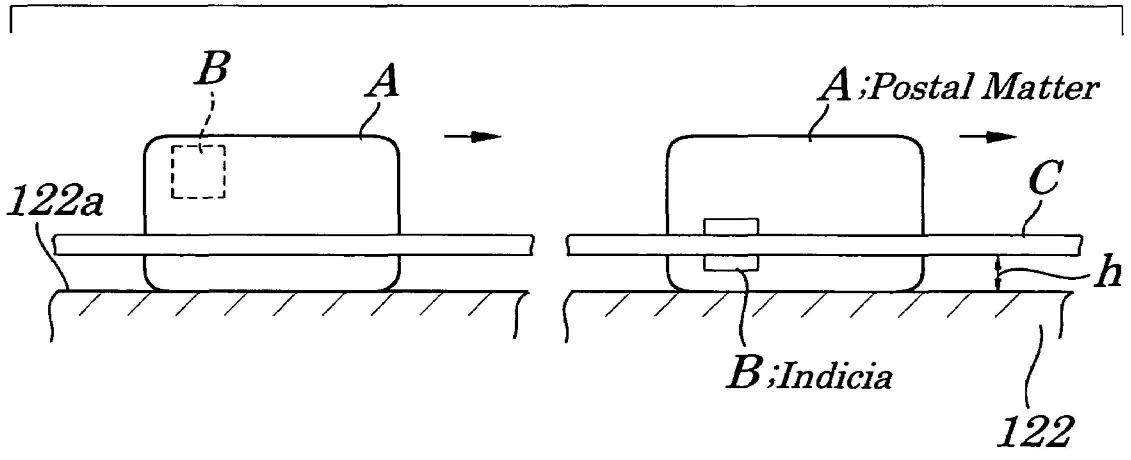
FIG. 15 (PRIOR ART)
FIG. 15 is yet still another diagram showing operations of the image inputting device of the indicia detecting processing module to explain the conventional technology.

FIG. 6 is a diagram schematically illustrating configurations of an indicia detection processing module 71 of a third embodiment of the present invention. FIG. 7 is a diagram schematically showing configurations of an indicia detection processing module of the third embodiment. FIG. 8 is a time chart explaining operations of the indicia detection processing module of the third embodiment. The indicia detection processing module of the third embodiment differs from those of the first embodiment in that an ultraviolet light LED (Light Emitting Diode) is used as a light source, instead of an ultraviolet fluorescent lamp, and receives fluorescence or phosphorescence on a same optical path by turning ON/OFF an ultraviolet light LED and fluorescence and phosphorescence images are detected according to timing of the ON/OFF operations. Configurations other than those described above are the same as those in the first embodiment and their descriptions are omitted accordingly.

The indicia detection processing module 71 of the third embodiment, as shown in FIG. 6, includes an image inputting unit 72 making up a culling-facing-canceling machine for nonstandard size postal matter (flat mail) F and to radiate the nonstandard size postal matter F with ultraviolet light and to receive fluorescence or phosphorescence from a postage stamp or a meter or a like being affixed or printed on the nonstandard size postal matter F, a detection unit 73 to detect a kind, position, amount, or the like of the indicia, and a carrying section 4 to carry the unformed postal matter F in a specified carrying direction (not shown), a background displaying section 5 made up of phoshor and being placed to detect a size of the nonstandard size postal matter F, and a proximity detecting section 6 to detect an approach of the nonstandard size postal matter F. In the embodiment, the indicia detection processing module 71, as in the case of the first embodiment, is mounted so as to be inclined at a specified angle θ (for example, 10°) relative to a plane face (see FIG. 2).

The image inputting unit 72, as shown in FIG. 7, includes a housing 74, a light radiating section 75 to generate ultraviolet light and to radiate the postal matter F with the ultraviolet light, a light receiving section 76 (shown in FIG. 7) to receive fluorescence or phosphorescence from the indicia, and an image signal processing section 77. On a side of the carrying section 4 in the housing 74 is placed an aperture 74*a* to radiate the postal matter F with ultraviolet light emitted from the light radiating section 75 and to allow fluorescence or phosphorescence emitted from the indicia to be incident therein and a transparent window member 78 made of synthetic silica glass is fitted into the aperture 74*a*. Since the transparent window member 78 is fitted into the aperture 74*a*, invasion of dust into the inside of the housing 74 is prevented. The synthetic silica glass being a material making up the transparent window member 78 has sufficient optical transmittance that allows visible light to ultraviolet light to be transmitted through the material and is made up of compositions that emit no fluorescence when being radiated with ultraviolet light. This prevents occurrence of an offset noise in detected images caused by fluorescence emitted from the transparent window member 78 itself and avoids degradation in detecting capability.

The light radiating section 75, as shown in FIGS. 6 and 7, includes a pair of ultraviolet light LED array 79 and 79 to emit ultraviolet light, reflecting plates 81 and 81 being arranged on rear sides of the ultraviolet light LED array 79 and 79 and to cause ultraviolet light emitted from ultraviolet light LED array 79 and 79 be reflected on a side of the carrying section 4, and filters 82 and 82 to allow ultraviolet light to be transmitted and to block visible light. In the ultraviolet light LED array 79 and 79, the ultraviolet light LEDs are arranged, along a direction orthogonal to the fluorescence and phosphorescence detection optical axis Lc, in an array state so that a position of a light emitting area (not shown) in a height direction (not shown) coincides with a position of a band-shaped detecting field of view (not indicated in Figures) (in the embodiment, about 300 nm in a longitudinal direction) of fluorescence and phosphorescence in a height direction (not shown) and so that the detecting field of view (not shown) is radiated uniformly.

The ultraviolet light LED array 79 is driven by an LED driving circuit (not shown) serving as a light radiation limiting means and repeats an ON/OFF operation (flashing) at a frequency of 1.25 Hz and at a duty ratio of 50%. The reflecting plate 81 is made of stainless steel being excellent in weather resistance and having a high light resistance against ultraviolet light in particular and its surface on the ultraviolet light LED array 79 is polished.

Each filter 82, 82 is placed on a side of the carrying section 4 of the ultraviolet light LED array 79. The ultraviolet light LED array 79 is considered to emit only the ultraviolet light according to its principles, however, it also emits a small amount of visible light. When the postal matter F is radiated with visible light, the visible light causes an offset noise of a detected image, causing degradation in detecting capability. To prevent the emission of visible light, the filters 82, 82 are provided.

The light receiving section 76, as shown in FIG. 7, includes mirrors 83 and 84 to make fluorescence or phosphorescence emitted from the indicia be reflected along the fluorescence and phosphorescence detecting optical axis Lc, a near-infrared cut filter 85, a condenser lens 86, a color linear CCD array 87 to receive an image formed by light gathered by the condenser lens 86.

The mirrors 83 and 84 are used with an aim of increasing a length of an optical path to suppress variations in magnification for the fluorescence detecting optical axis La and of making the image inputting device compact. The near-infrared cut filter 85 is used to prevent a color image from becoming reddish by allowing light having a wavelength of 650 nm or less to be transmitted and by using a CCD providing a little sensitivity characteristic in a near-infrared area other than a visible light area. The image signal processing section 77 includes a CCD circuit 88 to make photoelectric conversion, a video signal processing circuit 89 to amplify an electrical signal output from the CCD circuit 88 and to normalize a signal level and to make A/D conversion, an image data transmitting circuit 91 to make parallel to serial conversion to a video signal output from the video signal processing circuit 89 and to transmit the converted signal to the detection unit 73. The electric signal output from the CCD circuit 88 is amplified by the video signal processing circuit 89, for example, 30-fold. The image data transmitting circuit 91 adjusts timing with which the image is captured and makes a frequency conversion required to transfer fluorescence image data to the detection unit 73 and to transfer fluorescence image data, together with a control signal, to the detection unit 73, using an LDVS signal.

Next, operations of the indicia detection processing module 71 having configurations as above are explained by referring to FIG. 8. The ultraviolet light LED array 79, 79 serving as a light sources repeat ON/OFF operations (flashing) at a frequency of 1.25 Hz and at a duty ratio of 50% ($t2-t1=t4-t3$). In FIG. 8, a waveform "a" shows a change in amounts of light emitted from the ultraviolet light LED array 79 and represents that the operation is in the ON state during the period of time $t1 \leqq t \leqq t2$ and the operation is in the OFF state during the period of time $t2 \leqq t \leqq t3$. Also, in FIG. 8, a waveform "b" shows a sampling signal of a fluorescence image and the waveform "c" shows a sampling signal of a phosphorescence image. The postal matter F, when being introduced into the indicia detection processing module 71, is placed on a carrying belt 4*a* in a state in which the nonstandard size postal matter F is erected on the carrying belt 4*a* and is supported by the side belt (not shown) and is inclined at a specified angle θ, and is then carried toward the image inputting unit 72 at a specified speed (for example, 1.5 m/sec) by the carrying belt 4*a* and the side belt.

The postal matter F, when having passed by the proximity detecting section 6, is radiated with ultraviolet light emitted from the light radiating section 75 in the image inputting unit 72 during a specified radiating period of time (for example, $t1 \leqq t \leqq t2$).

When the postal matter F is radiated uniformly with ultraviolet light, fluorescence is emitted from phosphor after having been pumped and, for example, in the case of the meter, when the indicia on the postal matter "F" passes by a fluorescence detecting field of view (not shown), red fluorescence is reflected off the mirrors 83 and 84 along the fluorescence and phosphorescence detecting optical axis Lc and, after its travelling direction is changed, transmits through the near-infrared cutting filter 85. Then, the red fluorescence is gathered by the condenser lens 86 and the gathered fluorescence forms an image on a color monochrome linear CCD array 87 and the image is converted photo-electrically by the CCD circuit 88 and is amplified by the video signal processing circuit 89 and is input to the detection unit 73 through the image data transmitting circuit 91.

Moreover, when the indicia is the postage stamp (one being employed, for example, in the United States) and the indicia contains, for example, a substance that emits phosphorescence, during the non-radiating period during which no ultraviolet light are emitted (for example, $t2 \leqq t \leqq t3$), green phosphorescence is reflected off the mirrors 83 and 84 along the fluorescence and phosphorescence detecting optical axis Lc and, after its travelling direction is changed, transmits through the near-infrared cutting filter 85. Then, the red fluorescence is gathered by the condenser lens 86 and the gathered fluorescence forms an image on the color monochrome linear CCD array 87 and the image is converted photo-electrically by the CCD circuit 88 and is amplified by the video signal processing circuit 89 and is input to the detection unit 73 through the image data transmitting circuit 91.

Moreover, in the case where the ordinary stamp serving as the indicia emits green phosphorescence and the express stamp emits red phosphorescence (being employed, for example, in Japan), during non-exposure time, green phosphorescence and red phosphorescence are incident and detected. Here, the CCD circuit 88 performs resetting of exposure by the CCD, in synchronization with timing with which switching between the ON and OFF states of the ultraviolet light LED array 79, 79 is done, every time for the switching between the ON and OFF states of the ultraviolet LED array 79, 79. Data is sampled every time immediately before the exposure by the CCD. Thus, fluorescence is received during the radiating period (for example, $t1 \leqq t \leqq t2$) and phosphorescence is received during the non-radiating period (for example, $t2 \leqq t \leqq t3$) alternately, and one line color image data made up of fluorescence and phosphorescence images in every sampling process is captured alternately.

The image data transmitting circuit 91 judges whether the sampled one line image data is fluorescence image data or phosphorescence image data depending on a state of the ultraviolet light LED array 79, 79 and transmits color image data to the detection unit 73 by adding header information as to whether the image data is derived from the fluorescence or from the phosphorescence. The detection unit 73 has a buffer (not shown) for receiving fluorescence image data and a buffer for receiving phosphorescence image data. Both the buffers are switched according to the header information for every line data. The detection unit 73 finally receives the fluorescence image data and the phosphorescence image data as separate images and performs detection on each image data.

As a result, the detection unit 73 receives red fluorescence when the indicia is the meter, green phosphorescence when the indicia is the postage stamp (being employed, for example, in the United States), green phosphorescence when the indicia is the postage stamp (being employed, for example, in Japan) being the ordinary stamp and red phosphorescence when the postage stamp is the express stamp. Thus, the detection unit 73 can detect and identify the indicia from color information. In the embodiment, since a speed in a carrying direction is 1.5 [m/sec] and radiating time for one line is 400 [μs], resolution in a carrying direction is 1.6 [piece/mm] (1/(1.5 [m/sec]×400 [μsec], which is a value being sufficiently large to detect a position for stamping and canceling a postage stamp, and facing postal matter.

Thus, in the embodiment, approximately the same effects obtained in the first embodiment described above can be achieved. Additionally, since the ultraviolet light LED is flashed and fluorescence is received during radiating time and phosphorescence is received during non-radiating time, the fluorescence image and phosphorescence image can be detected in a same field of view and the same optical axis can be used, the number of components can be reduced almost to a half, thus achieving miniaturization and cost reduction.

It is apparent that the present invention is not limited to the above embodiments but may be changed and modified without departing from the scope and spirit of the invention. For example, in the above embodiments, ultraviolet light are used to generate fluorescence and phosphorescence. However, an X-light, gamma light or a like may be employed. The sensor being usable is not limited to a line sensor. By using an area sensor made up of image pickup devices (image detecting devices) arranged in a matrix form, an entire surface of the postal matter may be scanned at one time. Also, instead of the ultraviolet fluorescent lamp or ultraviolet light LED, a high-pressure mercury lamp or a like may be employed.

Moreover, a means for receiving phosphorescence and a means for receiving fluorescence may be provided separately. In the first embodiment, the monochrome linear CCD array is used. However, a color sensor having a sensitivity area corresponding to emitted colors of fluorescence and phosphorescence may be employed. Moreover, the detection unit 3, after identifying a size of the nonstandard size postal matter F in the height direction (not shown) and obtaining information about a position resulting from the measurement from an upper portion (for example, upper side of the nonstandard size postal matter F) toward a lower portion in the height direction of the indicia, may transmit the obtained information to the cancellation processing module 104. This enables the cancellation processing module to be so configured that, by, for example, reversing the nonstandard size postal matter F upside-down, the postage stamp can be canceled in a stamping range of, for example, 150 mm being one-half of 300 mm, which contributes to cost reduction. Moreover, the indicia detection processing module 1 employed in the above embodiment may be so configured that, by mounting not only a pair of the image inputting unit 2 and background displaying section 5 but also a pair of the detection unit 3 and proximity detecting sections 6, an obverse and a reverse face of the nonstandard size postal matter F can be independently scanned. Furthermore, the indicia detection processing module 1 may be so configured that only one image inputting unit or the like is mounted and that the nonstandard size postal matter F is introduced into the indicia detection processing module 1 with directions of the obverse and reverse face of the nonstandard size postal matter F being aligned in advance.

Moreover, in the embodiment, a postal matter is carried by using a carrying belt as a carrying means. However, the postal matter can be carried, for example, by making the postal matter be slid on a tilted surface.

Furthermore, the image inputting device of the present invention may be used not only for detecting an indicia being affixed or painted on a postal matter but also for detecting or identifying a position, kind, amount of a object that generally emits fluorescence and phosphorescence when being radiated with ultraviolet light.

What is claimed is:

1. An image inputting device comprising:

a carrying unit to carry an object along a specified carrying direction that passes through a radiating area and a non-radiating area located downstream in said carrying direction with respect to said radiating area, the object having a marking pattern comprising a phosphorescent material or a fluorescent material;

a light radiating unit to radiate light toward said object being carried by said carrying unit to make said marking pattern emit at least phosphorescence or fluorescence;

a light radiation limiting unit to limit light radiation from said light radiating unit toward said non-radiating area; and an image detecting unit to detect an image by receiving the fluorescence or the phosphorescence emitted from said object, said light radiation limiting unit comprising a light-blocking plate to block light emitted from said light radiating unit toward a field of view in said non-radiating area, wherein, when the phosphorescence is emitted from said object in said non-radiating area, said image detecting unit detects the image by receiving the phosphorescence.

2. The image inputting device according to claim 1, further comprising a background emitter to emit background light by receiving the radiated light from said light radiating unit and to enable at least one dimension of said object to be detected by the background light, said background emitter is placed behind said object being carried.

3. The image inputting device according to claim 2, wherein said background emitter comprises a fluorescent substance which emits the background light by receiving the radiated light from said light radiating unit.

4. The image inputting device according to claim 1, wherein said image detecting unit detects a monochrome image each of said radiative area and said non-radiating area.

5. The image inputting device according to claim 4, wherein said image detecting unit comprises a monochrome linear charge coupled device in which light sensing devices are arranged in a straight line form.

6. The image inputting device according to claim 1, wherein said light radiating unit comprises a light source and a filter to block visible light contained in light emitted from said light source and to allow ultraviolet light to be transmitted.

7. The image inputting device according to claim 6, wherein said light source comprises an ultraviolet fluorescent lamp.

8. The image inputting device according to claim 1, wherein said light radiating unit comprises at least one ultraviolet light emitting diode being able to perform ON/OFF flashing operations at a specified frequency and wherein said image detecting unit detects a color image in a line-shaped field of view with timing with which a color image detecting operation is performed in synchronization with the ON operations of said ultraviolet light emitting diode and with which said color image detecting operation is performed in synchronization with the OFF operations of said ultraviolet light emitting diode and captures an separately a first color image by receiving the fluorescence emitted from said object during a period of said ON operations and a second color image by receiving the phosphorescence emitted from said object during a period of said OFF operations.

9. The image inputting device according to claim 8, wherein said image detecting unit comprises a color linear charge coupled device array in which light sensing devices are arranged in a straight line form, said color linear charge coupled device array capturing separately said first color image during the period of said ON operations and said second color image during the period of said OFF operations.

10. The image inputting device according to claim 1, wherein said object comprises a postal matter and said marking pattern is an area in which an indicia affixed or printed on said postal matter is placed.

11. The image inputting device according to claim 1, wherein said image detecting unit detects the image by receiving fluorescence or phosphorescence emitted from said object in a belt-shaped field of view along a direction almost orthogonal to said specified carrying direction.

12. The image inputting device according to claim 11, wherein said image detecting unit detects a monochrome image in said belt-shaped field of view in each of said radiating arca and said non-radiating area.

13. An image inputting device comprising:

a carrying means to carry an object along a specified carrying direction that passes through a radiating area and a non-radiating area located downstream in said carrying direction with respect to said radiating area, the object having a marking pattern comprising a phosphorescent material or a fluorescent material;

a light radiating means to radiate light toward said object being carried by said carrying unit to make said marking pattern emit phosphorescence or fluorescence;

a light radiation limiting means to limit light radiation from said light radiating means toward said non-radiating area; and an image detecting means to detect an image by receiving the fluorescence or the phosphorescence emitted from said object, said light radiation limiting means comprising a light-blocking plate to block light emitted from said light radiating means toward a field of view in said non-radiating area, wherein, when the phosphorescence is emitted from said object in said non-radiating area, said image detecting means detects the image by receiving the phosphorescence.

14. The image inputting device according to claim 13, further comprising a background emitter to emit background light by receiving the radiated light from said light radiating means and to enable at least one dimension of said object to be detected by the background light, said background emitter is placed behind said object being carried.

15. The image inputting device according to claim 14, wherein said background emitter comprises a fluorescent substance which emits the background light by receiving the radiated light from said light radiating means.

16. The image inputting device according to claim 13, wherein said image detecting means detects a monochrome image each of said radiating area and said non-radiating area.

17. The image inputting device according to claim 16, wherein said image detecting means comprises a monochrome linear charge coupled device in which light sensing devices are arranged in a straight line form.

18. The image inputting device according to claim 13, wherein said light radiating means comprises a light source and a filter to block visible light contained in light emitted from said light source and to allow ultraviolet light to be transmitted.

19. The image inputting device according to claim 18, wherein said light source comprises an ultraviolet fluorescent lamp.

20. The image inputting device according to claim 13, wherein said light radiating means comprises at least one ultraviolet light emitting diode being able to perform ON/OFF flashing operations at a specified frequency and wherein said image detecting means detects a color image in a line-shaped field of view with timing with which a color image detecting operation is performed in synchronization with the ON operations of said ultraviolet light emitting diode and with which said color image detecting operation is performed in synchronization with the OFF operations of said ultraviolet light emitting diode and captures separately a first color image by receiving the fluorescence emitted from said object during a period of said ON operations and a second color image by receiving the phosphorescence emitted from said object during a period of said OFF operations.

21. The image inputting device according to claim 20, wherein said image detecting means comprises a color linear charge coupled device array in which light sensing devices are arranged in a straight line form said color linear charge coupled device array capturing separately said first color image during the period of said ON operations and said second color image during the period of said OFF operations.

22. The image inputting device according to claim 13, wherein said object comprises a postal matter and said marking pattern is an area in which an indicia affixed or printed on said postal matter is placed.

* * * * *